(12) United States Patent
Lina

(10) Patent No.: US 9,417,058 B1
(45) Date of Patent: Aug. 16, 2016

(54) DETECTING A POSITION OF A SHEET OF LIGHT IN AN IMAGE

(71) Applicant: MATROX ELECTRONIC SYSTEMS LTD., Dorval (CA)

(72) Inventor: Arnaud Lina, Montreal (CA)

(73) Assignee: MATROX ELECTRONIC SYSTEMS LTD., Dorval, QC (CA)

( * ) Notice: Subject to any disclaimer, the term of this patent is extended or adjusted under 35 U.S.C. 154(b) by 124 days.

(21) Appl. No.: 14/522,766

(22) Filed: Oct. 24, 2014

(51) Int. Cl.
*G06K 9/00* (2006.01)
*G01B 11/14* (2006.01)
*G01J 1/42* (2006.01)

(52) U.S. Cl.
CPC .. *G01B 11/14* (2013.01); *G01J 1/42* (2013.01)

(58) Field of Classification Search
None
See application file for complete search history.

(56) References Cited

U.S. PATENT DOCUMENTS

| | | | |
|---|---|---|---|
| 4,000,397 A | 12/1976 | Hebert et al. | |
| 4,645,347 A * | 2/1987 | Rioux | G01C 11/00 250/208.1 |
| 4,819,197 A * | 4/1989 | Blais | H03K 5/1532 250/214 DC |
| 4,966,459 A | 10/1990 | Monchalin | |
| 5,155,775 A | 10/1992 | Brown | |
| 5,774,572 A * | 6/1998 | Caspi | G06T 3/403 382/141 |
| 5,923,023 A | 7/1999 | Arends et al. | |
| 5,953,124 A | 9/1999 | Deck | |
| 5,999,587 A | 12/1999 | Ning et al. | |
| 6,343,741 B1 * | 2/2002 | Arends | G06K 7/14 235/456 |
| 6,512,993 B2 | 1/2003 | Kacyra et al. | |
| 6,704,099 B2 | 3/2004 | Uomori et al. | |
| 6,975,755 B1 * | 12/2005 | Baumberg | G06K 9/4642 345/419 |
| 7,577,312 B2 | 8/2009 | Sandrew | |
| 7,601,978 B2 * | 10/2009 | Sari-Sarraf | D06H 3/08 250/559.06 |
| 7,903,864 B1 * | 3/2011 | Lina | G01N 23/04 382/141 |
| 8,334,900 B2 | 12/2012 | Qu et al. | |
| 8,537,338 B1 | 9/2013 | Medasani et al. | |
| 8,620,089 B1 | 12/2013 | Korah et al. | |
| 8,660,362 B2 * | 2/2014 | Katz | G06K 9/00201 382/199 |
| 2003/0031385 A1 * | 2/2003 | Elad | G06T 7/0085 382/300 |
| 2003/0169375 A1 * | 9/2003 | Lin | H04N 19/865 348/625 |

(Continued)

OTHER PUBLICATIONS

Matiukas et al.; "Detection of Laser Beam's Center-line in 2D Images", Electronics and Electrical Engineering, High Frequency Technology, Microwaves, 2009, No. 7(95), pp. 67-70.

(Continued)

*Primary Examiner* — Aaron W Carter
(74) *Attorney, Agent, or Firm* — Norton Rose Fulbright Canada LLP

(57) ABSTRACT

In a method and system for detecting a position of a sheet of light in an image, two parameters are used, namely the width of the widest peak to be detected and the intensity difference of the least-contrasted peak to be detected. From these two parameters, a size S, a distance D, and a threshold T are determined. A region of interest (ROI) is determined based on the intensity profile associated with a line of pixels of the image, distance D and threshold T. A derivative filter of size S is applied to the intensity profile to produce a slope of the intensity profile. In the determined ROI, one or more zero-crossings in the slope of the intensity profile are detected. From the detected zero-crossings, a zero-crossing is selected and the position of the selected zero-crossing is returned as the detected position of the sheet of light for the line of pixels.

26 Claims, 8 Drawing Sheets

(56) References Cited

U.S. PATENT DOCUMENTS

| | | | | |
|---|---|---|---|---|
| 2004/0247174 | A1* | 12/2004 | Lyons | G06F 3/04845 382/154 |
| 2011/0229029 | A1* | 9/2011 | Kass | G06T 5/002 382/168 |
| 2013/0100250 | A1 | 4/2013 | Raskar et al. | |
| 2014/0008549 | A1 | 1/2014 | Thériault et al. | |
| 2014/0161359 | A1* | 6/2014 | Magri | G06T 7/0085 382/199 |
| 2015/0052426 | A1* | 2/2015 | Wu | G06K 9/00449 715/255 |
| 2015/0379942 | A1* | 12/2015 | Guo | G09G 3/3426 345/102 |

OTHER PUBLICATIONS

Matabosch et al.; "Registration of Moving Surfaces by Means of One-Shot Laser Projection", J.S. Marques et al. (Eds.): IbPRIA 2005, LNCS 3522, pp. 145-152, 2005, Springer-Verlag Berlin Heidelberg 2005.

Salvi et al., "Pattern codification strategies in structured light systems", Pattern Recognition, Institut d'informàtica i Aplicacions, Universitat de Girona, Av. Lluis Santaló, sin, E-17071 Girona, Spain, received Mar. 6, 2003; accepted Oct. 2, 2003, IEEE.

Forest et al., "Laser stripe peak detector for 3D scanners. A FIR filter approach", Computer Vision and Robotics Lab., Politècnica P-IV, Campus Montilivi, 17003 Girona, Catalonia, 2004, IEEE.

Forest et al., "A proposal for laser scanners sub-pixel accuracy peak detector", Universitat de Girona, Institut d'Informàtica i Aplicacions 17003 Girona, Catalonia, 2003.

Wang et al., "Modeling outlier formation in scanning reflective surfaces using a laser stripe scanner", Department of Mechanical Engineering, The University of British Columbia, Vancouver, BC, V6T 1Z4, Canada, 2014 Elsevier Ltd.

Lee, "Surface extraction from a three-dimensional data set", United States Statutory Invention Registration No. H1530, Published May 7, 1996.

* cited by examiner

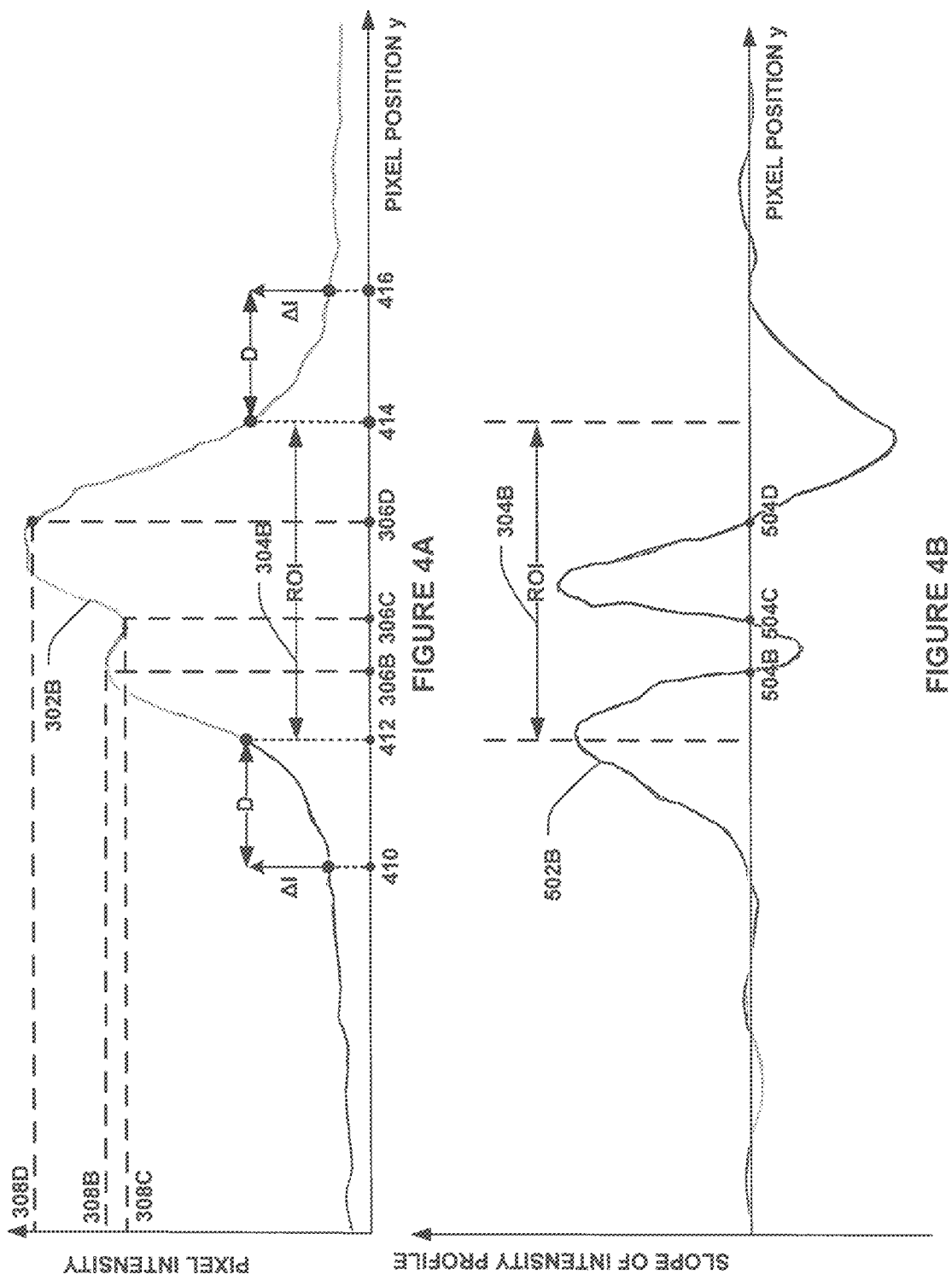

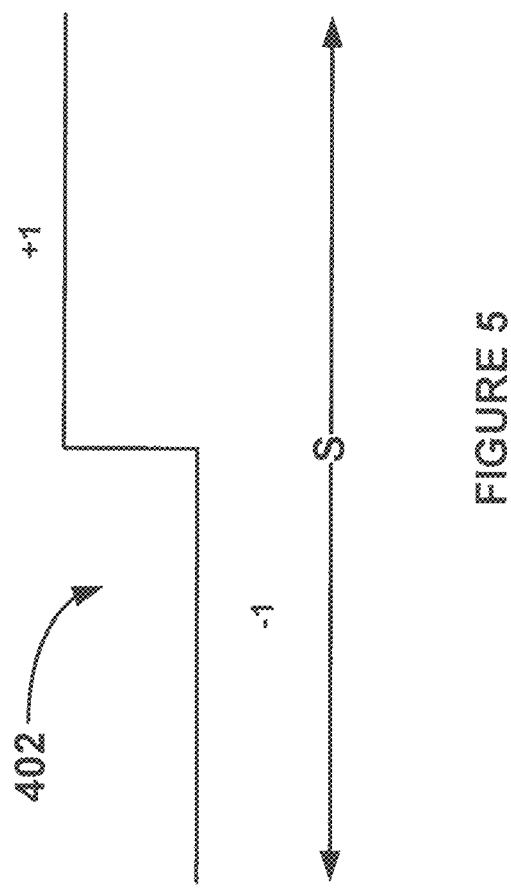

DETECTING A POSITION OF A SHEET OF LIGHT IN AN IMAGE

TECHNICAL FIELD

The present invention relates to the detection of the position of a sheet of light in an image. Applications for the detection method include three-dimensional measurement and reconstruction.

BACKGROUND OF THE ART

In a typical three-dimensional (3D) measurement/reconstruction system, an object of interest is illuminated by a laser, an image of the object illuminated by the laser is acquired, and the position of the laser beam in the acquired image is detected. The accuracy of the 3D measurement/reconstruction depends on the accuracy of the detected position of the laser beam in the acquired image.

A common technique used to detect the position of a laser beam in an image is to determine the center of gravity of a laser peak in an intensity profile. A window of fixed size is moved across the intensity profile and for each window position, a sum or average of the pixel intensities in the window is computed. Window positions having a sum (average) of pixel intensities below a predefined threshold are discarded. Among the remaining window positions, the window position having the highest sum (average) of pixel intensities is selected and the center of gravity of the selected window position is returned as the detected laser position.

This technique has several limitations and is therefore not suitable for certain applications. For example, the technique is very sensitive to variations in the background intensity (DC offset) of the intensity profile. In addition, the effectiveness of the technique is highly dependent on the choice of the size of the window and the technique lacks robustness with regards to saturated peaks and large variations in peak widths. Therefore, there is a need for an improved method for detecting the position of a laser beam in an image.

SUMMARY

There is described a method and system for detecting a position of a sheet of light in an image. The image comprises a line of pixels with an associated intensity profile. Two parameters are used, namely the width of the widest peak to be detected and the intensity difference of the least-contrasted peak to be detected. From these two parameters, a size S, a distance D, and a threshold T are determined. A region of interest (ROI) is determined based on the intensity profile, distance D and threshold T. A derivative filter of size S is applied to the intensity profile to produce a slope of the intensity profile. In the determined ROI, one or more zero-crossings in the slope of the intensity profile are detected. From the detected zero-crossings, a zero-crossing is selected and the position of the selected zero-crossing is returned as the detected position of the sheet of light for the line of pixels.

In accordance with a first broad aspect, there is provided a method for detecting a position of a sheet of light in an image. The method comprises receiving an image of the sheet of light as projected onto an object, the image comprising a line of pixels with an associated intensity profile; setting a size S of a derivative filter to be at least as large as a width W of a widest peak to be detected in the intensity profile; determining a region of interest for detection by locating intensity differences in the intensity profile that are at least as large as a threshold value; applying the derivative filter of size S to the intensity profile to obtain a slope of the intensity profile; detecting one or more zero-crossings in the slope of the intensity profile inside the region of interest, each one of the one or more detected zero-crossings having a corresponding pixel position in the intensity profile; selecting a zero-crossing from the one or more detected zero-crossings; and outputting the corresponding pixel position of the selected zero-crossing as the detected position of the sheet of light for the line of pixels.

In accordance with a second broad aspect, there is provided a field-programmable gate array (FPGA) configured for detecting a position of a sheet of light in an image. The FPGA has logic programmed for receiving an image of the sheet of light as projected onto an object, the image comprising a line of pixels with an associated intensity profile; setting a size S of a derivative filter to be at least as large as a width W of a widest peak to be detected in the intensity profile; determining a region of interest for detection by locating intensity differences in the intensity profile that are at least as large as a threshold value; applying the derivative filter of size S to the intensity profile to obtain a slope of the intensity profile; detecting one or more zero-crossings in the slope of the intensity profile inside the region of interest, each one of the one or more detected zero-crossings having a corresponding pixel position in the intensity profile; selecting a zero-crossing from the one or more detected zero-crossings; and outputting the corresponding pixel position of the selected zero-crossing as the detected position of the sheet of light for the line of pixels.

In accordance with another broad aspect, there is provided a system for detecting a position of a sheet of light in an image. The system comprises a memory; a processor coupled to the memory; and an application stored in the memory. The application is executable by the processor for receiving an image of the sheet of light as projected onto an object, the image comprising a line of pixels with an associated intensity profile; setting a size S of a derivative filter to be at least as large as a width W of a widest peak to be detected in the intensity profile; determining a region of interest for detection by locating intensity differences in the intensity profile that are at least as large as a threshold value; applying the derivative filter of size S to the intensity profile to obtain a slope of the intensity profile; detecting one or more zero-crossings in the slope of the intensity profile inside the region of interest, each one of the one or more detected zero-crossings having a corresponding pixel position in the intensity profile; selecting a zero-crossing from the one or more detected zero-crossings; and outputting the corresponding pixel position of the selected zero-crossing as the detected position of the sheet of light for the line of pixels.

In accordance with yet another broad aspect, there is provided a computer readable medium having stored thereon program code for execution by a processor for detecting a position of a sheet of light in an image. The program code comprises instructions for receiving an image of the sheet of light as projected onto an object, the image comprising a line of pixels with an associated intensity profile; setting a size S of a derivative filter to be at least as large as a width W of a widest peak to be detected in the intensity profile; determining a region of interest for detection by locating intensity differences in the intensity profile that are at least as large as a threshold value; applying the derivative filter of size S to the intensity profile to obtain a slope of the intensity profile; detecting one or more zero-crossings in the slope of the intensity profile inside the region of interest, each one of the one or more detected zero-crossings having a corresponding pixel position in the intensity profile; selecting a zero-crossing from the one or more detected zero-crossings; and outputting the corresponding pixel position of the selected zero-crossing as the detected position of the sheet of light for the line of pixels.

Embodiments of the method, FPGA, system, and/or computer readable medium may comprise one or more of the following features.

In some embodiments, determining a region of interest for detection comprises setting the threshold value to be smaller than an intensity difference of a least-contrasted peak to be detected; and locating each of the intensity differences in the intensity profile over a distance D, where the distance D is set to be at least as large as half of the width W of the widest peak to be detected. In some embodiments, determining a region of interest for detection comprises scanning the intensity profile in one direction, determining an entry point of the region of interest by locating a first increase in intensity over the distance D that is at least as large as the threshold value; and determining an exit point of the region of interest by locating a first decrease in intensity over the distance D that is at most equal to the threshold value.

In some embodiments, outputting the corresponding pixel position of the selected zero-crossing comprises estimating a sub-pixel position using interpolation (e.g., linear interpolation) of at least two pixel positions.

In some embodiments, the derivative filter is a uniform derivative filter. In some embodiments, the size S of the derivative filter is even and the derivative filter is anti-symmetric.

In some embodiments, the sheet of light is generated using a laser.

In some embodiments, each one of the one or more detected zero-crossings has a corresponding pixel intensity in the intensity profile, and selecting a zero-crossing from the one or more detected zero-crossings comprises selecting the zero-crossing having the greatest pixel intensity.

In some embodiments, additional information is output in addition to the corresponding pixel position of the selected zero-crossing. In some embodiments, each one of the one or more detected zero-crossings has a corresponding pixel intensity in the intensity profile, and the corresponding pixel intensity of the selected zero-crossing is provided as an output. In some embodiments, a width of the region of interest is output as an estimate of a width of the sheet of light.

In some embodiments, the image comprises a plurality of lines of pixels, each one of the plurality of lines of pixels having an associated intensity profile, and a position of the sheet of light is detected for each one of the plurality of lines of pixels.

BRIEF DESCRIPTION OF THE DRAWINGS

Further features and advantages of the present invention will become apparent from the following detailed description, taken in combination with the appended drawings, in which:

FIG. 3a is an exemplary intensity profile of a line of pixels;

FIG. 3b is an exemplary slope of an intensity profile for the intensity profile of FIG. 3a;

FIG. 4a is an exemplary intensity profile of another line of pixels;

FIG. 4b is an exemplary slope of an intensity profile for the intensity profile of FIG. 4a;

FIG. 5 is an exemplary derivative filter;

It will be noted that throughout the appended drawings, like features are identified by like reference numerals.

DETAILED DESCRIPTION

Figure 1:
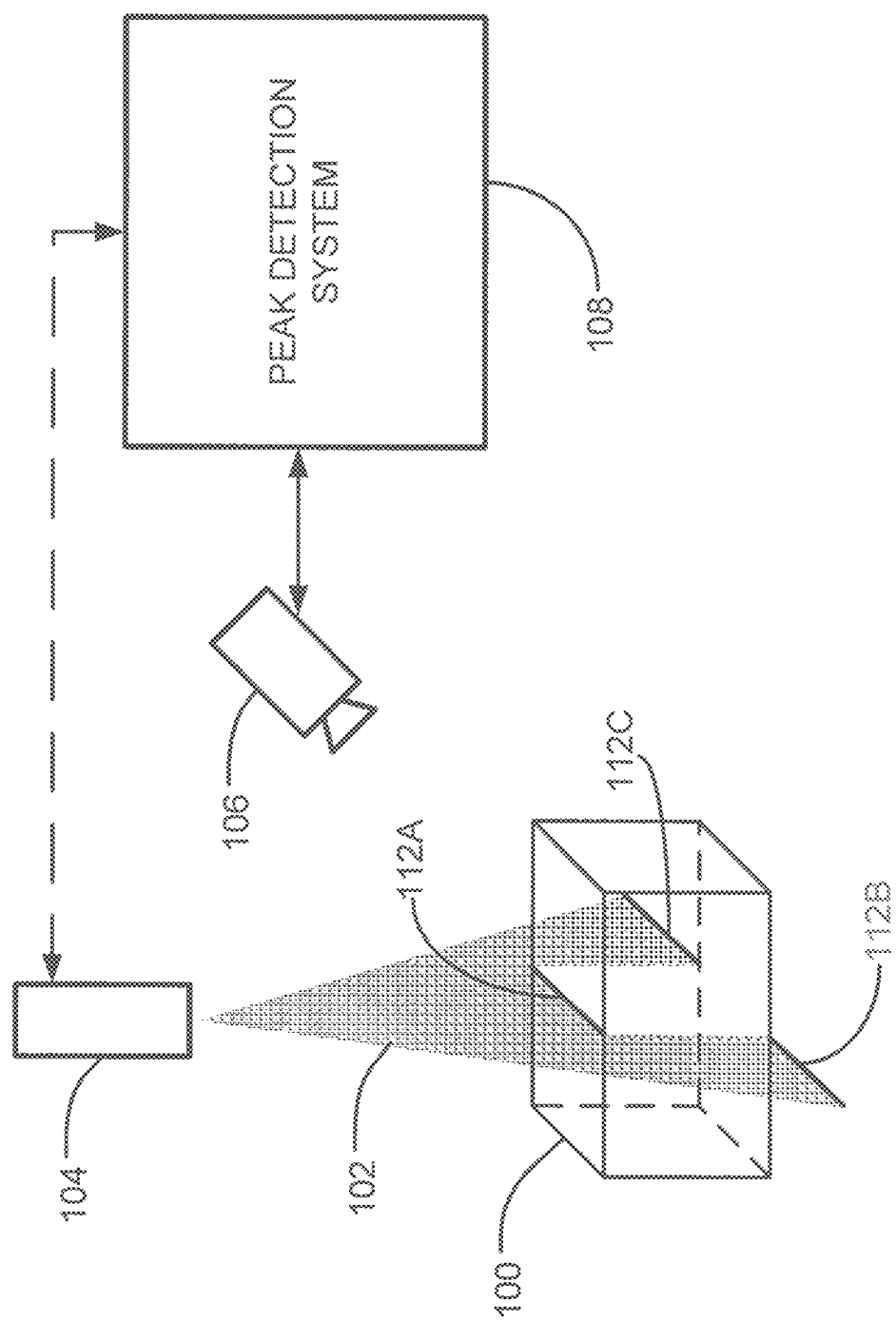
FIG. 1 is a schematic of an exemplary 3D measurement/reconstruction system incorporating the peak detection system.

FIG. 1 illustrates an exemplary 3D measurement/reconstruction system. An object 100 of interest is illuminated with a "sheet of light" 102 generated using a light source 104 such as a laser, Digital Light Processing (DLP) projector or other adequate light source. One or more projections 112a, 112b, 112c of the sheet of light 102 on the object 100 provide information on the contour of the object 100. The projections 112a, 112b, 112c will vary in position, shape and number, as well as in width and brightness, as a function of the position, shape and properties of the object 100 and light source 104. To measure the position of these projections 112a, 112b, 112c, an image of the object 100 illuminated by the light source 104 is acquired using an image acquisition device 106 (such as a digital camera) and the position of the sheet of light 102 in the acquired image is detected by a peak detection system 108.

Figure 2:
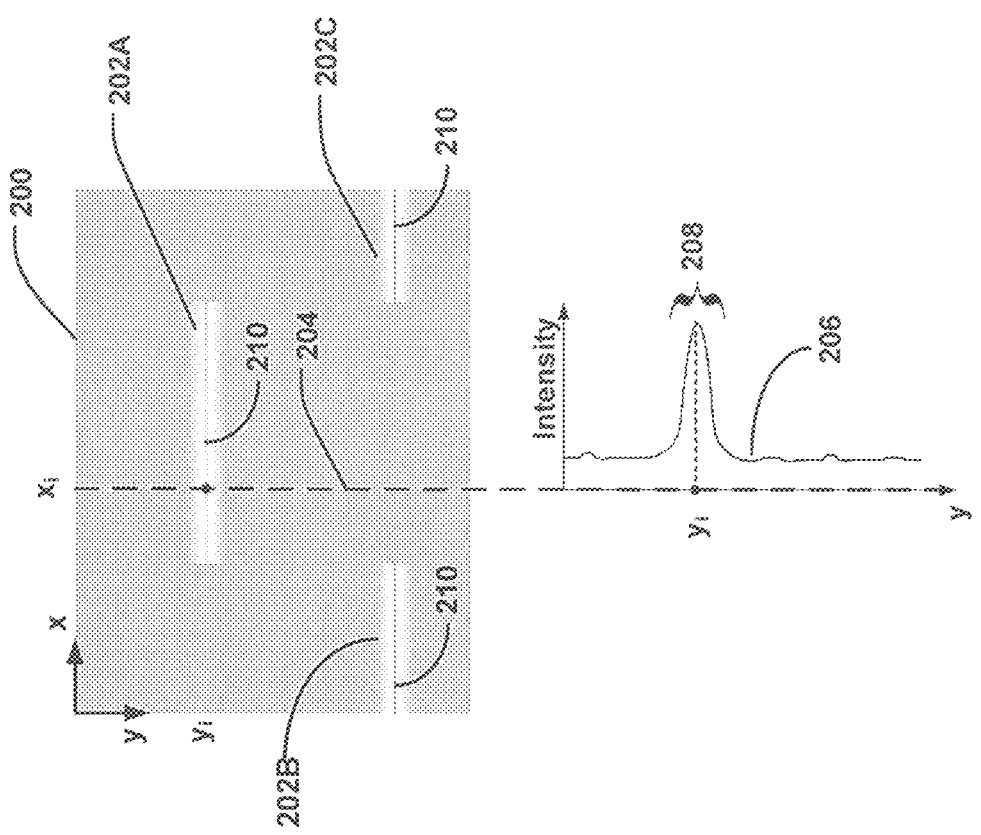
FIG. 2 is an exemplary two-dimensional (2D) image as received by the peak detection system.

FIG. 2 illustrates an exemplary 2D image 200, as acquired by the image acquisition device 106, of the object 100 with the sheet of light 102 projected thereon. In other embodiments, the image may be a one-dimensional (1D) image consisting of a single line of pixels, as obtained using a line scan camera for example. The projections 112a, 112b, 112c of the sheet of light 102 appear in the image 200 as brighter portions 202a, 202b, 202c (in this example, forming horizontal line segments). In the image 200, a scan line 204 of pixels at position $x_i$ is shown to have a corresponding intensity profile 206. Note that while a vertical scan line 204 is illustrated, horizontal scan lines may also be used. The intensity profile 206 represents the pixel intensity (e.g., grayscale intensity) along scan line 204 as a function of the pixel location y. The intensity profile 206 comprises a peak 208 which corresponds to the sheet of light in the scan line 204. The peak detection system 108 is configured to determine the position $y_i$ of the peak 208. In some embodiments, the image comprises a plurality of scan lines of pixels, each one having an associated intensity profile. The peak detection system 108 may thus be configured to detect the position of the sheet of light in each scan line of pixels. For example, in the 2D image 200, the peak detection system 108 may be configured to detect the position $y_i$ of the sheet of light in each column of pixels $x_i$ where i=1, 2, . . . N and return an array of detected positions $Y=[y_1, y_2, \ldots y_N]$ shown collectively as 210. In some cases, no sheet of light is detected in the intensity profile, in which case the detection method may return a value indicating that no sheet of light was detected for the line of pixels. In other cases, multiple positions for the sheet of light may be detected within a single intensity profile (e.g., due to the shape of the object or because multiple sheets of light are projected onto the object), in which case the detection method may return the multiple detected positions for the line of pixels.

The peak detection system 108 is configured to detect the position of the sheet of light in the image based on two parameters namely the width W of the widest peak to be detected and the intensity difference $\Delta I_{min}$ of the least-contrasted peak to be detected. From these two parameters, the peak detection system 108 may set other parameters needed to perform the peak detection. These parameters may be set by a user of the peak detection system 108 or may be set by a manufacturer (e.g., programmer) of the peak detection system 108. The values of these parameters may be selected based on known properties of the light source 104, image acquisition device 106, and/or object 100 of interest or may be selected based on observation of sample images, for example.

Figures 3A, 3B:
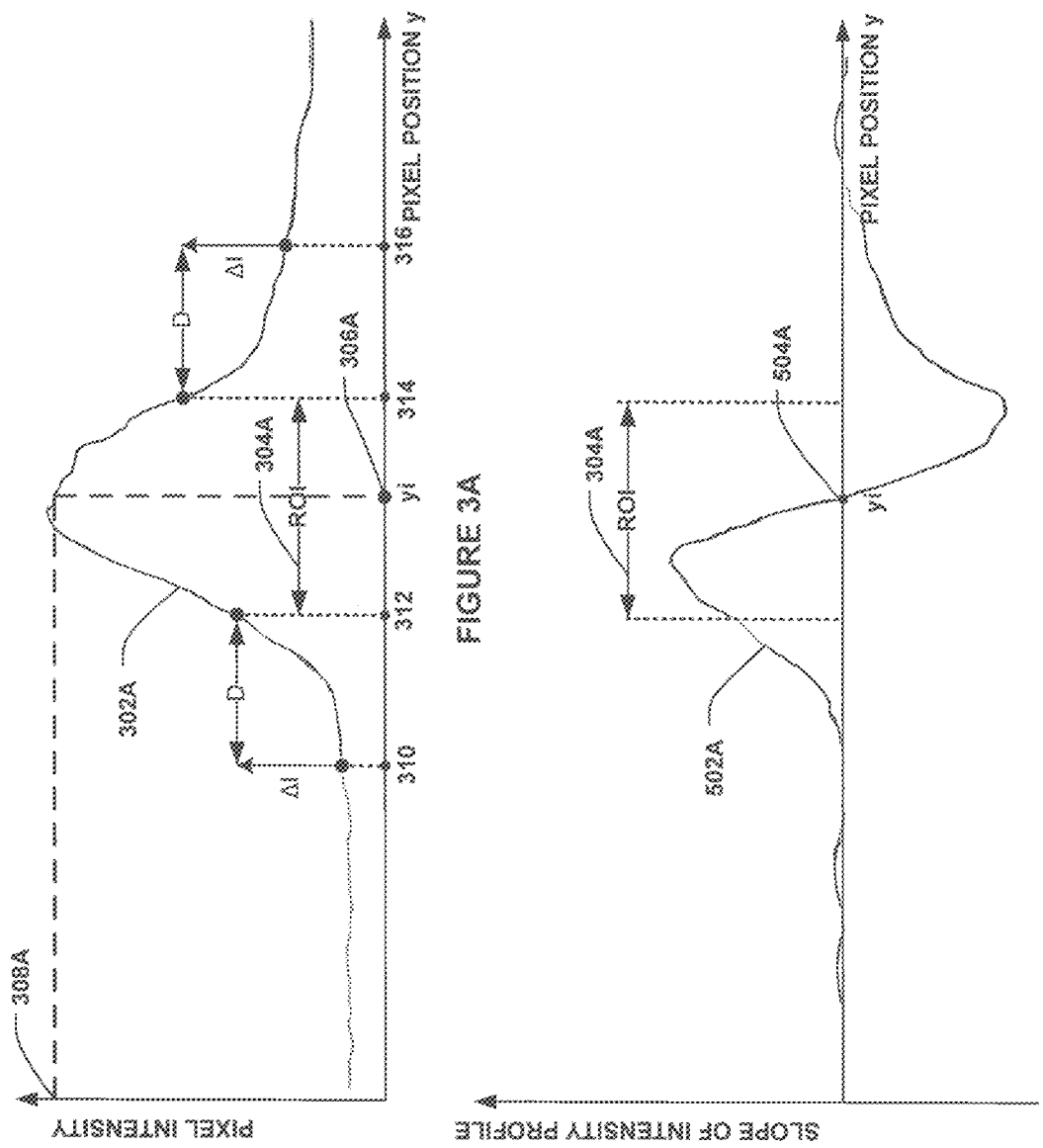

FIG. 3a is an exemplary intensity profile 302a associated with a line of pixels of a given image, the line of pixels being a row or a column of pixels, for example. FIG. 4a is another exemplary intensity profile 302b, associated with a different line of pixels.

A size S of a derivative filter to be applied to the intensity profile 302a, 302b is set to be at least as large as the width W of the widest peak to be detected. In some embodiments, the derivative filter is anti-symmetric and the size S of the derivative filter is even. An exemplary derivative filter 402 is illustrated in FIG. 5. In this example, the derivative filter 402 is a uniform (or "rectangular") derivative filter with a size of S. Filter coefficients (−1, +1) are used to calculate the first derivative of the intensity profile 302a, 302b. Other coefficients may also be used, such as (−2, +2), (−3, +3), etc., and optionally, the result of the convolution may be divided by the coefficient value to remove the scaling effect (or gain). Other derivative filters, such as a Gaussian derivative filter, an oriented Gaussian derivative filter, a Laplacian derivative filter, or any other suitable derivative filter, may be used to produce a slope of the intensity profile.

A region of interest (ROI) 304A, 304B is defined in each intensity profile 302a, 302b. The ROI 304A, 304B is used to limit the detection to a smaller portion of the intensity profile 302a, 302b, thereby ignoring portions of the intensity profile where the peak, and thus the position of the sheet of light, is known to be absent. Generally, limiting the detection to the ROI makes the detection method more robust to noise. In addition, limiting the detection to the ROI may increase the speed of the detection method. The ROI may be defined by locating intensity differences $\Delta I$ in the intensity profile that are at least as large as a threshold value T. In some embodiments, defining the ROI comprises setting the threshold value T to be smaller than the intensity difference $\Delta I_{min}$ of the least-contrasted peak to be detected, and locating the intensity differences $\Delta I$ over a distance D, where the distance D is set to be at least as large as half of the width W of the widest peak to be detected.

In some embodiments, determining the ROI comprises scanning the intensity profile in one direction (e.g., from left to right) and determining an entry point of the ROI by locating a first increase in intensity over the distance D that is at least as large as the threshold value T, and then, determining an exit point of the ROI by locating a first decrease in intensity over the distance D that is at most equal to the threshold value T. In one such embodiment, the ROI may be determined according to the following steps. The intensity profile is scanned in one direction (e.g., from left to right). An entry point to the ROI is determined by locating a first pair of pixel locations (310 and 312 in FIG. 3A, 410 and 412 in FIG. 4A) separated by a distance D where the intensity increase over the pair of pixel locations is at least as large as the threshold value T; the second pixel location of the pair of pixel locations (312 in FIG. 3A, 412 in FIG. 4A) is selected as the entry point of the ROI. Then, an exit point of the ROI is determined by locating a first pair of pixel locations (314 and 316 in FIG. 3A, 414 and 416 in FIG. 4A) separated by a distance D where the intensity decrease over the pair of pixel locations is at most equal to the threshold value T; the first pixel location (314 in FIG. 3A, 414 in FIG. 4A) of the pair of pixel locations is selected as the exit point of the ROI.

In some cases, no ROI is found in the intensity profile, in which case the detection method may return a value indicating that no sheet of light was detected in the line of pixels. In other cases, multiple ROIs may be found within a single intensity profile, in which case detection is limited to the multiple ROIs in the intensity profile.

The derivative filter of size S is applied to the intensity profile 302a, 302b in order to obtain a slope (or derivative) of the intensity profile. For example, a convolution may be performed between the intensity profile 302a, 302b and a derivative kernel. FIGS. 3b and 4b illustrate exemplary slopes 502a, 502b of the intensity profiles 302a, 302b, respectively. Note that the derivative filter may be applied to the entire intensity profile (as illustrated in FIGS. 3b and 4b) or may be applied only to the portion of the intensity profile within the ROI.

One or more zero-crossings are detected in the slope of the intensity profile inside the region of interest. Each of the detected zero-crossings has a corresponding pixel position and a corresponding pixel intensity in the intensity profile. One zero-crossing 504a is found in the slope 502a inside the ROI 304a. The zero-crossing 504a has a corresponding pixel position 306a and pixel intensity 308a in the intensity profile 302a. Three zero-crossings 504b, 504c, 504d are found in the slope 502b inside the ROI 304b. The zero-crossing 504b has a corresponding pixel position 306b and pixel intensity 308b in the intensity profile 302b. The zero-crossing 504c has a corresponding pixel position 306c and pixel intensity 308c in the intensity profile 302b. The zero-crossing 504d has a corresponding pixel position 306d and pixel intensity 308d in the intensity profile 302b.

A zero-crossing is selected from the one or more detected zero-crossings and the corresponding pixel position $y_i$ of the selected zero-crossing is returned as the detected position of the sheet of light for the line of pixels. In some embodiments, additional information is returned, such as the corresponding pixel intensity of the selected zero-crossing and/or the width of the region of interest as an estimate of a width of the sheet of light. For the intensity profile 302a and slope 502a, the zero-crossing 504a is selected and the corresponding pixel position 306a is returned as the detected position $y_i$ of the sheet of light for the respective line of pixels. Optionally, the corresponding pixel intensity 308a and/or the width of the ROI 304a may be returned. For the intensity profile 302b and slope 502b, the zero-crossing 504d is selected (e.g., for the reasons described below) and the corresponding pixel position 306d is returned as the detected position $y_i$ of the sheet of light for the respective line of pixels. Optionally, the corresponding pixel intensity 308d and/or the width of the ROI 304b may be returned. The pixel position of the selected zero-crossing is output as the detected position of the sheet of light for the line of pixels. In some embodiments, the detected position of the sheet of light in the line of pixels (e.g., in pixel coordinates) may be converted to a position of the sheet of light on the surface of the object (e.g., in world coordinates) in the 3D measurement/reconstruction system, using a calibration process for example. The corresponding pixel intensity may be used to validate the detected position of the sheet of light. The width of the ROI may be provided as an estimate of the width of the sheet of light in the line of pixels, which may in turn be used to validate the detected position of the sheet of light.

In some embodiments, selecting a zero-crossing from the detected zero-crossings comprises comparing the corresponding pixel intensities of the detected zero-crossings and selecting the zero-crossing having the greatest pixel intensity. For the intensity profile 302b and slope 502b, the zero-crossing 504d is selected because its corresponding pixel intensity 308d is greater than the corresponding pixel intensities 308b and 308c of zero-crossing 504b and 504c. In some embodiments, a sub-pixel position of the selected zero-crossing may be estimated using interpolation of at least two pixel positions. The interpolation may be linear, bilinear, nearest neighbor, bicubic, etc.

Figure 6:
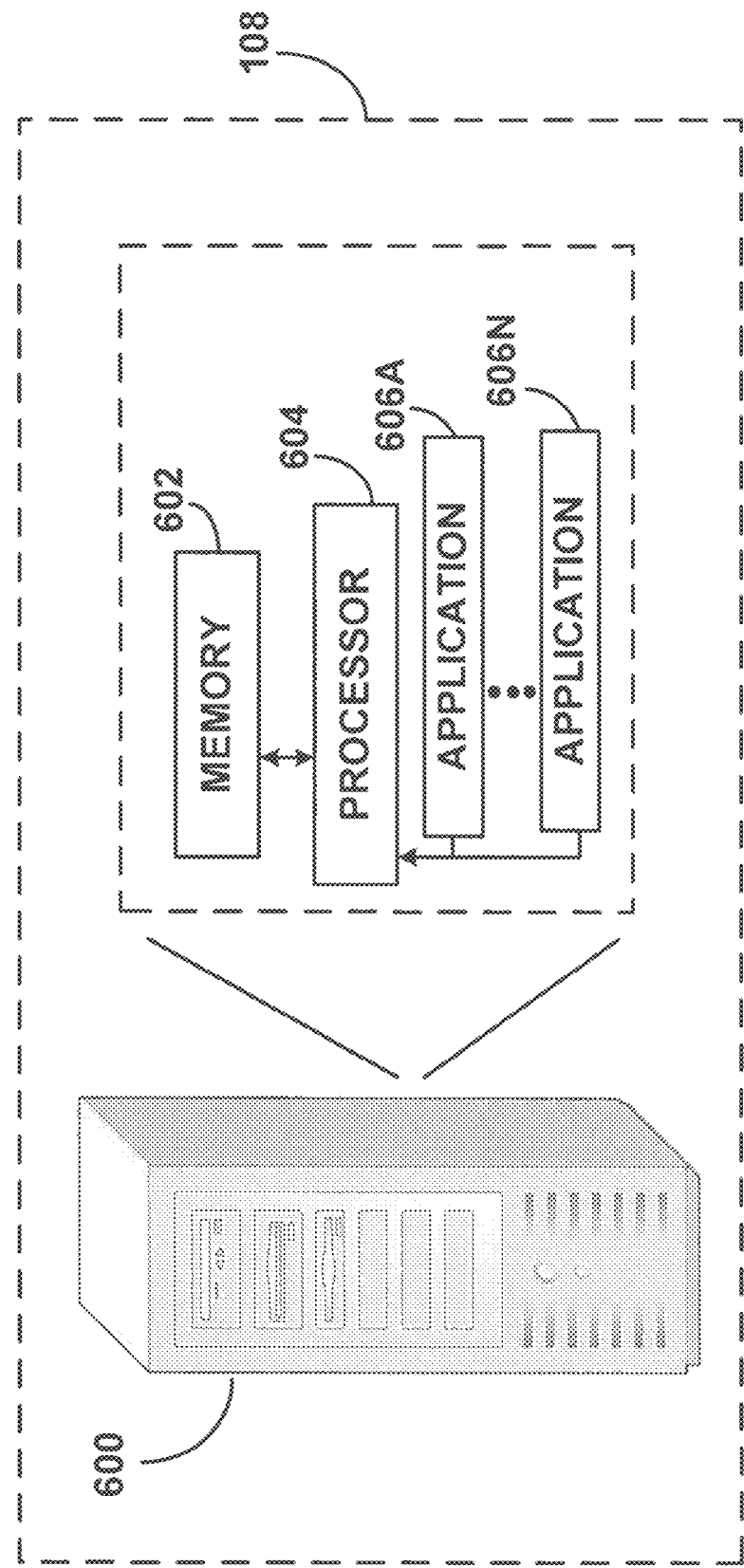
FIG. 6 is an exemplary embodiment of the peak detection system using a combination of hardware and software.

FIG. 6 is an exemplary embodiment of the peak detection system 108. In this example, the peak detection system 108 illustratively comprises one or more server(s) 600. For example, a series of servers corresponding to a web server, an application server, and a database server may be used. These servers are all represented by server 600. The server 600 may comprise, amongst other things, a plurality of applications 606a . . . 606n running on a processor 604 coupled to a memory 602. It should be understood that while the applications 606a . . . 606n presented herein are illustrated and described as separate entities, they may be combined or separated in a variety of ways. The server 600 may comprise a suitably-programmed general-purpose computer or a specialized industrial computer, for example.

The memory 602 accessible by the processor 604 may receive and store data. The memory 602 illustratively has stored therein any one of settings for the image acquisition device 106, settings for the light source 104, acquired images, lines of pixels, intensity profiles, slopes of intensity profiles, parameters for the derivative filter, parameters for the region of interest (ROI), detected zero-crossings, selected zero-crossings, pixel positions of detected/selected zero-crossings, detected position of the sheet of light, pixel intensities of detected/selected zero-crossings, size S of the derivative filter, distance D, threshold T, width W of the widest peak to be detected, intensity difference $\Delta I_{min}$ of the least-contrasted peak to be detected, intensity differences $\Delta I$ in the intensity profile, etc. In some embodiments, any of the above data may be stored remotely from the peak detection system 108 and accessed via a wired or wireless connection. The memory 602 may be a main memory, such as a high speed Random Access Memory (RAM), or an auxiliary storage unit, such as a hard disk, a floppy disk, or a magnetic tape drive. The memory 602 may be any other type of memory, such as a Read-Only Memory (ROM), or optical storage media such as a videodisc and a compact disc. The processor 604 may access the memory 602 to retrieve or store data. The processor 604 may be any device that can perform operations on data. Examples are a central processing unit (CPU), a front-end processor, a microprocessor, and a network processor. The applications 606a . . . 606n are executable by the processor 604 and configured to perform various tasks. An output may be stored to memory 602, displayed to a user, or transmitted to another device, such as a personal computer, a tablet, a smart phone, industrial automation equipment, or the like.

The peak detection system 108 may be provided separately from the image acquisition device 106, as illustrated in FIG. 1, or the two may be provided together in a single housing (e.g., in a smart camera). For example, the peak detection system 108 may be integrated with the image acquisition device 106 either as a downloaded software application, a firmware application, or a combination thereof. The image acquisition device 106 may be any instrument capable of recording images that can be stored directly, transmitted to another location, or both. These images may be still photographs or moving images such as videos or movies. For example, the image acquisition device 106 may be a digital camera (e.g., grayscale or color), an analog camera with a frame grabber, a line scan camera, a scanner, etc.

The peak detection system 108 is operatively connected to the image acquisition device 106 for reception of acquired images. Similarly, in some embodiments, the peak detection system 108 may be operatively connected to the light source 104, for controlling and/or setting various parameters thereof. Various types of connections may be provided to allow the peak detection system 108 to communicate with the image acquisition device 106 and/or the light source 104. For example, the connections may comprise wire-based technology, such as electrical wires or cables, and/or optical fibers. The connections may also be wireless, such as RF, infrared, Wi-Fi, Bluetooth, and others. Connections may therefore comprise a network, such as the Internet, the Public Switch Telephone Network (PSTN), a cellular network, or others known to those skilled in the art. Communication over the network may occur using any known communication protocols that enable devices within a computer network to exchange information. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol).

The peak detection system 108 may be accessible remotely from any one of a plurality of devices, such as a personal computer, a tablet, a smart phone, or the like. In some embodiments, the peak detection system 108 may itself be provided directly on one of these devices, either as a downloaded software application, a firmware application, or a combination thereof. Similarly, the image acquisition device 106 may be integrated with one of these devices. In some embodiments, the image acquisition device 106 and the peak detection system 108 are both provided directly on one of these devices, either as a downloaded software application, a firmware application, or a combination thereof.

In some embodiments, the peak detection system 108 is implemented in part or in whole on a field-programmable gate array (FPGA). Programmable logic components of the FPGA may be configured to perform some or all of the steps of the method, analogously to the applications 606a . . . 606n running on the processor 604 of the embodiment illustrated in FIG. 6.

Figure 7:
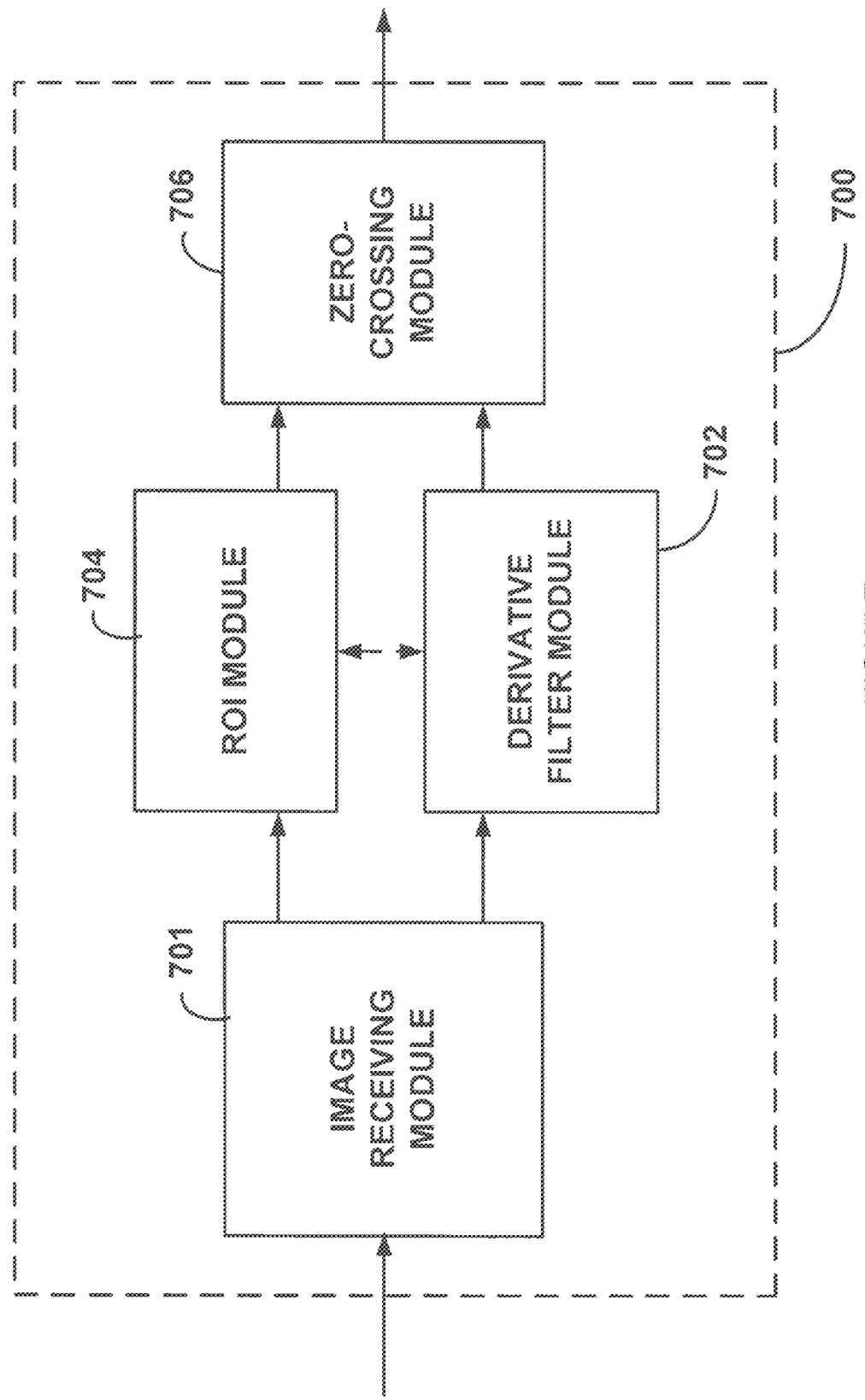
FIG. 7 is block diagram of an exemplary embodiment of an application or an FPGA implementation of the peak detection system.
Figure 8:
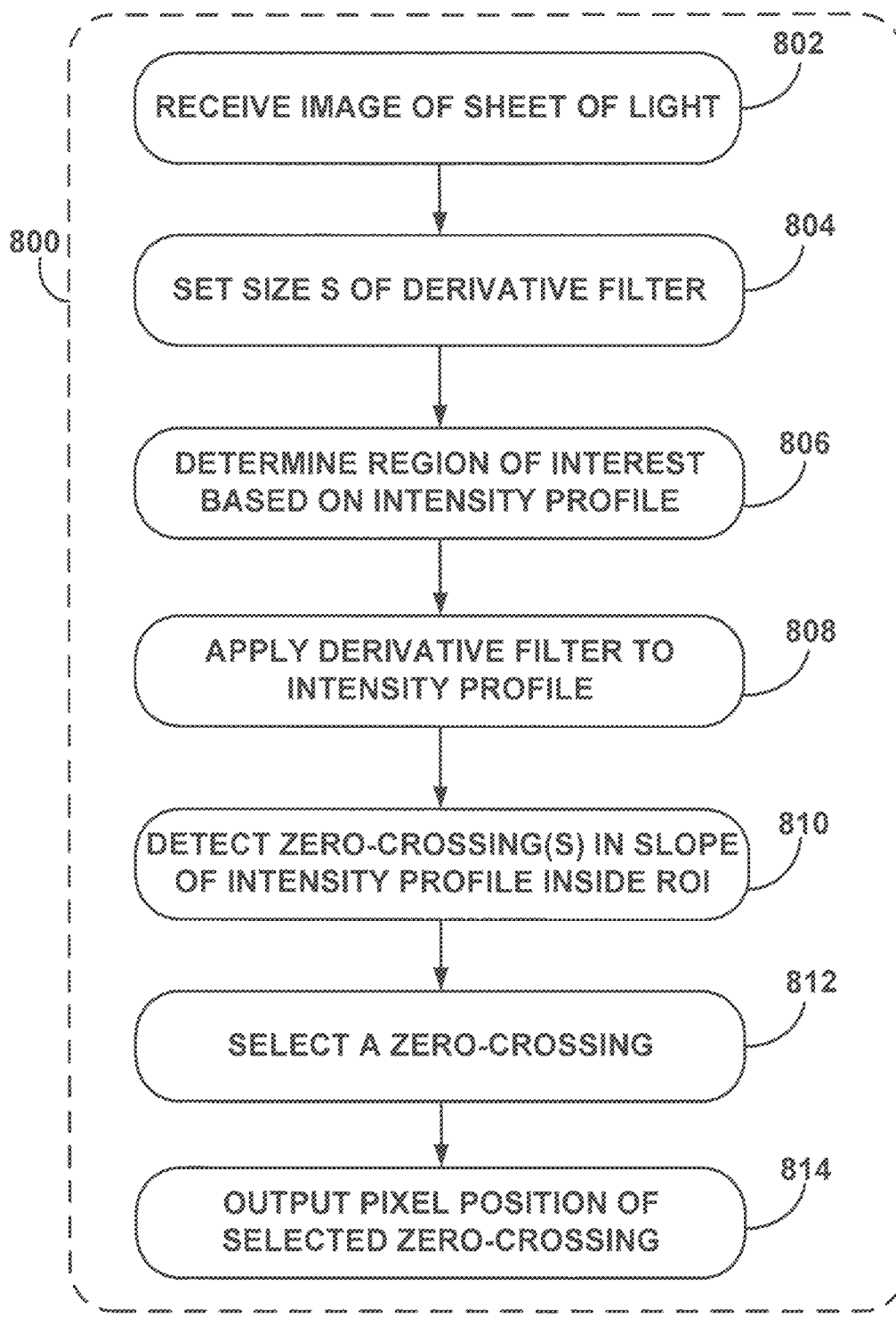
FIG. 8 is a flowchart of an exemplary method for detecting a position of a sheet of light in an image.

FIG. 7 is an exemplary peak detection system 700 as implemented in one or more applications 606a . . . 606n or as implemented in an FPGA for example. FIG. 8 is a flowchart illustrating an exemplary method 800 for detecting a position of a sheet of light in an image, as performed by the peak detection system 700 of FIG. 7 for example. The peak detection system 700 of FIG. 7 illustratively comprises an image receiving module 701, a derivative filter module 702, a ROI module 704, and a zero-crossing module 706.

The image receiving module 701 is configured to receive an image of a sheet of light as projected onto an object, as per step 802. The image comprises a line of pixels with an associated intensity profile. In some embodiments, the image comprises a plurality of lines of pixels, each with an associated intensity profile, and the method 800 is repeated (in whole or in part) for each line of pixels.

As per step 804, the size S of a derivative filter is set to be at least as large as a width W of a widest peak to be detected in the intensity profile. In some embodiments, the size S of the derivative filter is set outside of the peak detection system 108 and stored in memory 602. In this case, the derivative filter module 702 may be configured to retrieve the parameters for the derivative filter from memory 602. Alternatively, the derivative filter module 702 may be configured to perform the step 804 of setting the size S of the derivative filter. In this case, the derivative filter module 702 may be configured to retrieve the width W of the widest peak to be detected from memory 602 or receive the width W of the widest peak as an input value. The derivative filter module 702 may then be configured to apply the derivative filter of size S to the intensity profile to obtain a slope of the intensity profile, as per step 808.

The ROI module 704 may be configured to determine a region of interest based on the intensity profile, as per step 806. In one embodiment, the image receiving module 701 is configured to provide the intensity profile to the ROI module 704. In an alternative embodiment, the image receiving module 701 is configured to store the intensity profile in memory 602 and the ROI module 704 is configured to retrieve it from memory 602. As indicated above, determining the ROI may comprise locating intensity differences $\Delta I$ over a distance D in the intensity profile that are at least as large as a threshold value T. As indicated above, in some embodiments, determining the ROI may comprise scanning the intensity profile in one direction (e.g., from left to right) and determining an entry point of the ROI by locating a first increase in intensity over the distance D that is at least as large as the threshold value T, and then, determining an exit point of the ROI by locating a first decrease in intensity over the distance D that is at most equal to the threshold value T. The ROI module 704 may thus be configured to retrieve a pre-set threshold T and distance D from memory 602. Alternatively, the ROI module 704 may be configured to retrieve from memory 602 (or receive as input) an intensity difference $\Delta I_{min}$ of a least-contrasted peak to be detected and a width W of a widest peak to be detected, and to set the threshold T and the distance D based on the retrieved/received values. Parameters defining the ROI as determined (e.g., the ROI entry and exit points) are then output by the ROI module 704.

In some embodiments, the derivative filter module 702 may be configured to receive or retrieve ROI-defining parameters determined by the ROI module 704 and to apply the derivative filter only to the portion of the intensity profile within the determined ROI.

The zero-crossing module 706 may be configured to detect one or more zero-crossings in the slope of the intensity profile inside the region of interest, as per step 810. The ROI-defining parameters may be provided by the ROI module 704 to the zero-crossing module 706. In an alternative embodiment, the ROI module 704 is configured to store the ROI-defining parameters in memory 602 and the zero-crossing module 706 is configured to retrieve them from memory 602. The zero-crossing module 706 may also be configured to select a zero-crossing from the one or more detected zero-crossings, as per step 812, and output the corresponding pixel position of the selected zero-crossing as the detected position of the sheet of light for the line of pixels, as per step 814. The zero-crossing module 706 may be configured to estimate a sub-pixel position using interpolation of at least two pixel positions and output the sub-pixel position.

In some embodiments, the zero-crossing module 706 is also configured to output the corresponding pixel intensity of the selected zero-crossing, and/or the width of the determined region of interest.

The peak detection system 700 and the accompanying method 800 for performing peak detection are suitable for applications that require speed, such as real-time processing of images in an industrial setting. The parameters W and $\Delta I_{min}$ are quantifiable values that may be used to set parameters S, D, and T in an automated manner. Setting the threshold value T to be smaller than the intensity difference $\Delta I_{min}$ of the least-contrasted peak to be detected allows the method 800 to be generally more robust to global variations in the background intensity (DC offset). Setting the size S of the derivative filter to be at least as large as the width W of the widest peak to be detected makes the method 800 generally more robust with regards to saturated peaks and variations in peak widths.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a different order, or blocks may be added, deleted, or modified. Other variants to the configurations of the image receiving module 701, derivative filter module 702, the ROI module 704, and the zero-crossing module 706 may also be provided and the example illustrated is simply for illustrative purposes.

While illustrated in the block diagrams as groups of discrete components communicating with each other via distinct data signal connections, it will be understood by those skilled in the art that the present embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims, such as a complete FPGA implementation. Also, one skilled in the relevant arts will appreciate that while the systems, methods and computer readable mediums disclosed and shown herein may comprise a specific number of elements/components, the systems, methods and computer readable mediums may be modified to include additional or fewer of such elements or components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A method for detecting a position of a sheet of light in an image, the method comprising:
   receiving an image of the sheet of light as projected onto an object, the image comprising a line of pixels with an associated intensity profile;
   setting a size S of a derivative filter to be at least as large as a width W of a widest peak to be detected in the intensity profile;
   determining a region of interest for detection by locating intensity differences in the intensity profile that are at least as large as a threshold value;
   applying the derivative filter of size S to the intensity profile to obtain a slope of the intensity profile;

detecting one or more zero-crossings in the slope of the intensity profile inside the region of interest, each one of the one or more detected zero-crossings having a corresponding pixel position in the intensity profile;

selecting a zero-crossing from the one or more detected zero-crossings; and outputting the corresponding pixel position of the selected zero-crossing as the detected position of the sheet of light for the line of pixels.

2. The method of claim 1, wherein determining a region of interest for detection comprises:

setting the threshold value to be smaller than an intensity difference of a least-contrasted peak to be detected; and locating each of the intensity differences in the intensity profile over a distance D, where the distance D is set to be at least as large as half of the width W of the widest peak to be detected.

3. The method of claim 2, wherein determining a region of interest for detection comprises:

scanning the intensity profile in one direction;

determining an entry point of the region of interest by locating a first increase in intensity over the distance D that is at least as large as the threshold value; and determining an exit point of the region of interest by locating a first decrease in intensity over the distance D that is at most equal to the threshold value.

4. The method of claim 1, wherein outputting the corresponding pixel position of the selected zero-crossing comprises estimating a sub-pixel position using interpolation of at least two pixel positions.

5. The method of claim 4, wherein the interpolation of at least two pixel positions is a linear interpolation.

6. The method of claim 1, wherein the derivative filter is a uniform derivative filter.

7. The method of claim 1, wherein the sheet of light is generated using a laser.

8. The method of claim 1, wherein each one of the one or more detected zero-crossings has a corresponding pixel intensity in the intensity profile and wherein the step of selecting a zero-crossing from the one or more detected zero-crossings comprises selecting the zero-crossing having the greatest pixel intensity.

9. The method of claim 1, wherein each one of the one or more detected zero-crossings has a corresponding pixel intensity in the intensity profile, and wherein the method further comprises outputting the corresponding pixel intensity of the selected zero-crossing.

10. The method of claim 1, further comprising outputting a width of the region of interest as an estimate of a width of the sheet of light.

11. The method of claim 1, wherein the size S of the derivative filter is even and wherein the derivative filter is anti-symmetric.

12. The method of claim 1, wherein the image comprises a plurality of lines of pixels, each one of the plurality of lines of pixels having an associated intensity profile, and wherein the method detects a position of the sheet of light for each one of the plurality of lines of pixels.

13. A field-programmable gate array (FPGA) configured for detecting a position of a sheet of light in an image, the FPGA having logic programmed for:

receiving an image of the sheet of light as projected onto an object, the image comprising a line of pixels with an associated intensity profile;

setting a size S of a derivative filter to be at least as large as a width W of a widest peak to be detected in the intensity profile;

determining a region of interest for detection by locating intensity differences in the intensity profile that are at least as large as a threshold value;

applying the derivative filter of size S to the intensity profile to obtain a slope of the intensity profile;

detecting one or more zero-crossings in the slope of the intensity profile inside the region of interest, each one of the one or more detected zero-crossings having a corresponding pixel position in the intensity profile;

selecting a zero-crossing from the one or more detected zero-crossings; and outputting the corresponding pixel position of the selected zero-crossing as the detected position of the sheet of light for the line of pixels.

14. The FPGA of claim 13, wherein determining a region of interest for detection comprises:

setting the threshold value to be smaller than an intensity difference of a least-contrasted peak to be detected; and locating each of the intensity differences in the intensity profile over a distance D, where the distance D is set to be at least as large as half of the width W of the widest peak to be detected.

15. The FPGA of claim 14, wherein determining a region of interest for detection comprises:

scanning the intensity profile in one direction;

determining an entry point of the region of interest by locating a first increase in intensity over the distance D that is at least as large as the threshold value; and determining an exit point of the region of interest by locating a first decrease in intensity over the distance D that is at most equal to the threshold value.

16. The FPGA of claim 13, wherein outputting the corresponding pixel position of the selected zero-crossing comprises estimating a sub-pixel position using interpolation of at least two pixel positions.

17. The FPGA of claim 16, wherein the interpolation of at least two pixel positions is a linear interpolation.

18. The FPGA of claim 13, wherein the derivative filter is a uniform derivative filter.

19. The FPGA of claim 13, wherein the sheet of light is generated using a laser.

20. The FPGA of claim 13, wherein each one of the one or more detected zero-crossings has a corresponding pixel intensity in the intensity profile and wherein the step of selecting a zero-crossing from the one or more detected zero-crossings comprises selecting the zero-crossing having the greatest pixel intensity.

21. The FPGA of claim 13, wherein each one of the one or more detected zero-crossings has a corresponding pixel intensity in the intensity profile, and wherein the logic is further configured for outputting the corresponding pixel intensity of the selected zero-crossing.

22. The FPGA of claim 13, further comprising outputting a width of the region of interest as an estimate of a width of the sheet of light.

23. The FPGA of claim 13, wherein the size S of the derivative filter is even and wherein the derivative filter is anti-symmetric.

24. The FPGA of claim 13, wherein the image comprises a plurality of lines of pixels, each one of the plurality of lines of pixels having an associated intensity profile, and wherein the logic is further configured for detecting a position of the sheet of light for each one of the plurality of lines of pixels.

25. A system for detecting a position of a sheet of light in an image, the system comprising:

a memory;

a processor coupled to the memory; and an application stored in the memory and executable by the processor for:
  receiving an image of the sheet of light as projected onto an object, the image comprising a line of pixels with an associated intensity profile;
  setting a size S of a derivative filter to be at least as large as a width W of a widest peak to be detected in the intensity profile;
  determining a region of interest for detection by locating intensity differences in the intensity profile that are at least as large as a threshold value;
  applying the derivative filter of size S to the intensity profile to obtain a slope of the intensity profile;
  detecting one or more zero-crossings in the slope of the intensity profile inside the region of interest, each one of the one or more detected zero-crossings having a corresponding pixel position in the intensity profile;
  selecting a zero-crossing from the one or more detected zero-crossings; and
  outputting the corresponding pixel position of the selected zero-crossing as the detected position of the sheet of light for the line of pixels.

26. A non-transitory computer readable medium having stored thereon program code for execution by a processor for detecting a position of a sheet of light in an image, the program code comprising instructions for:
  receiving an image of the sheet of light as projected onto an object, the image comprising a line of pixels with an associated intensity profile;
  setting a size S of a derivative filter to be at least as large as a width W of a widest peak to be detected in the intensity profile;
  determining a region of interest for detection by locating intensity differences in the intensity profile that are at least as large as a threshold value;
  applying the derivative filter of size S to the intensity profile to obtain a slope of the intensity profile;
  detecting one or more zero-crossings in the slope of the intensity profile inside the region of interest, each one of the one or more detected zero-crossings having a corresponding pixel position in the intensity profile;
  selecting a zero-crossing from the one or more detected zero-crossings; and
  outputting the corresponding pixel position of the selected zero-crossing as the detected position of the sheet of light for the line of pixels.

* * * * *